United States Patent
Lee et al.

(10) Patent No.: US 10,643,662 B1
(45) Date of Patent: May 5, 2020

(54) MOBILE AUGMENTED REALITY VIDEO EDITING SYSTEM

(71) Applicant: HY3D CO., LTD., Ansan-si (KR)

(72) Inventors: Jun Ho Lee, Ansan-si (KR); Hong Sik Ko, Yesan-gun (KR); Jeong Uk Lee, Hwaseong-si (KR); Yoon Young Yang, Ansan-si (KR); Sang Yeon Park, Namyangju-si (KR); Se Yoon Lee, Ansan-si (KR)

(73) Assignee: HY3D CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/249,227

(22) Filed: Jan. 16, 2019

(30) Foreign Application Priority Data

Dec. 12, 2018 (KR) .................. 10-2018-0160189

(51) Int. Cl.
| | | |
|---|---|---|
| *G11B 27/036* | (2006.01) | |
| *G06F 3/0484* | (2013.01) | |
| *G06F 3/0488* | (2013.01) | |
| *G06F 3/0481* | (2013.01) | |
| *G06T 19/00* | (2011.01) | |

(Continued)

(52) U.S. Cl.
CPC .......... *G11B 27/036* (2013.01); *G06F 3/0488* (2013.01); *G06F 3/04815* (2013.01); *G06F 3/04845* (2013.01); *G06F 16/7837* (2019.01); *G06K 9/6202* (2013.01); *G06N 20/00* (2019.01); *G06T 7/13* (2017.01); *G06T 19/006* (2013.01); *H04N 9/8715* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 9,626,798 B2 * | 4/2017 | Zavesky | .......... H04N 21/21805 |
| 10,002,442 B1 * | 6/2018 | Dagley | .................. G06T 15/20 |

(Continued)

FOREIGN PATENT DOCUMENTS

| | | |
|---|---|---|
| KR | 20130107404 | 10/2013 |
| KR | 20150091798 | 8/2015 |

(Continued)

OTHER PUBLICATIONS

Korean Office Action—Korean Application No. 10-2018-0160189 dated Jan. 16, 2020.

*Primary Examiner* — Gelek W Topgyal (74) *Attorney, Agent, or Firm* — Cantor Colburn LLP (57) ABSTRACT

Provided is a mobile augmented reality video editing system including a real image input section configured to receive a real image through an image sensor, a spatial recognizer configured to separately recognize the ground surface and a space within the real image, an object extraction and display section configured to extract and display objects in the real image, an editing tool display section configured to display video editing tools to a user, a video processor configured to delete an object touched for deletion by the user among the extracted and displayed objects in the real image and correct horizontal lines constituting a region of the deleted object by substituting each of the horizontal lines with a pixel value of the same height in an adjacent space, and a screen display section configured to display the real image corrected by the video processor.

9 Claims, 8 Drawing Sheets

(51) Int. Cl.
*G06K 9/62* (2006.01)
*H04N 9/87* (2006.01)
*G06F 16/783* (2019.01)
*G06N 20/00* (2019.01)
*G06T 7/13* (2017.01)

(56) References Cited

U.S. PATENT DOCUMENTS

| | | | | |
|---|---|---|---|---|
| 2007/0214476 | A1* | 9/2007 | Zalewski | H04N 7/17318 |
| | | | | 725/32 |
| 2011/0188780 | A1* | 8/2011 | Wang | G06T 7/529 |
| | | | | 382/293 |
| 2013/0044128 | A1* | 2/2013 | Liu | G09G 5/00 |
| | | | | 345/633 |
| 2014/0285522 | A1* | 9/2014 | Kim | G06T 19/006 |
| | | | | 345/633 |
| 2017/0200313 | A1* | 7/2017 | Lee | G06T 19/006 |
| 2017/0243352 | A1* | 8/2017 | Kutliroff | G06T 7/10 |
| 2019/0170510 | A1* | 6/2019 | Robinson | G01B 21/00 |

FOREIGN PATENT DOCUMENTS

| | | |
|---|---|---|
| KR | 101788046 | 10/2017 |
| KR | 20180000017 | 1/2018 |
| KR | 101923507 | 11/2018 |
| WO | 2018039270 | 3/2018 |

* cited by examiner

MOBILE DEVICE

MOBILE AUGMENTED REALITY VIDEO EDITING SYSTEM

BACKGROUND

1. Technical Field

The present invention relates to a system for implementing augmented reality and more particularly, to a mobile augmented reality video editing system.

2. Description of Related Art

With the invigoration of a mobile market and the development of technologies such as computer vision, sensors, and video processing, augmented reality and virtual reality technologies are being improved, and the distribution of applications employing these technologies is being accelerated. Also, as data processing rates of computers are increased, products and pieces of software based on machine learning gradually spread, and accordingly products and services based on image recognition are being produced in large quantities.

However, the existing augmented reality technology is implemented by taking a picture of an actual environment, overlaying a virtual space on the picture, and then compositing a virtual object into the corresponding space. In other words, since a replacement image is superimposed on a photographed image of the real space, advanced skills are required to edit a photographed specific object or shape, and the editing takes a longtime. Further, in some cases, additional equipment is required for chroma-key processing and the like. In addition, when editing an augmented reality video, a worker should put up with inconvenience of selecting an object or a shape to be edited in the video and repeating manipulation such as size adjustment and boundary setting.

Therefore, there is a necessity for a new mobile-type video editing tool or technology which is designed to remove inefficiency in editing an augmented reality video so that even a non-expert in video editing may conveniently and rapidly acquire a video that he or she wants.

RELATED-ART DOCUMENTS

Patent Documents (Patent Document 1) Korean Unexamined Patent Publication No. 10-2013-0107404
(Patent Document 2) Korean Patent No. 10-1788046

SUMMARY

1. Technical Problem

A technical objective of the present invention is to provide a mobile augmented reality video editing system which enables even a non-expert in video editing to conveniently and rapidly edit a video that he or she wants on a mobile.

Another technical objective of the present invention is to provide a mobile augmented reality video editing system capable of obtaining, when an object is deleted in an original video to edit an augmented reality video, a natural object-deleted video by compositing an optimal partial video to a position of the deleted object.

Another technical objective of the present invention is to provide a mobile augmented reality video editing system which freely changes a position of an object in a video so that the object may be adjusted in scale according to the changed position and harmonize with surrounding objects.

Another technical objective of the present invention is to provide a mobile augmented reality video editing system capable of implementing augmented reality by replacing an object in a video with a three-dimensional (3D) object which realistically and objectively depicts the object the best.

Another technical objective of the present invention is to provide a mobile augmented reality video editing system which implements augmented reality by compositing a 3D object and automatically adjusting the 3D object in scale so that the 3D object may harmonize with a composite video.

2. Solution to Problem

A mobile augmented reality video editing system according to an exemplary embodiment of the present invention can be implemented in the form of an application (app), which can be downloaded and executed in a mobile device, and includes: a real image input section configured to receive a real image through an image sensor; a spatial recognizer configured to separately recognize a ground surface and a space within the real image; an object extraction and display section configured to extract and display objects in the real image; an editing tool display section configured to display video editing tools to a user; a video processor configured to delete an object touched for deletion by the user among the extracted and displayed objects in the real image and correct horizontal lines constituting a region of the deleted object by substituting each of the horizontal lines with a pixel value of the same height in an adjacent space; and a screen display section configured to display the real image corrected by the video processor.

In the mobile augmented reality video editing system, the video processor may delete an object touched for movement by the user among the extracted and displayed objects from the real image, correct horizontal lines constituting a region of the deleted object by substituting each of the horizontal lines with a pixel value of the same height in an adjacent space, adjust a scale of the object touched for movement using three-dimensional (3D) coordinate values of a pixel corresponding to a position designated for object movement, and thereby generate a corrected video in which the object has been moved.

In addition to the aforementioned configuration, the mobile augmented reality video editing system of another modifiable configuration may further include an object storage configured to match an object, which is touched for storage by the user, among the extracted and displayed objects to an input filename and store the object in a storage.

In this case, the video processor may adjust a scale of an object selected from the storage by the user with 3D coordinate values of a pixel corresponding to a position designated for object composition, composite the selected object into the real image, and thereby generate a corrected video into which the object has been composited.

As another modifiable embodiment, the aforementioned mobile augmented reality video editing system may further include: an object transmitter configured to transmit an object touched for augmented reality by the user among the extracted and displayed objects to an interoperable external device via a communication network; and a service server configured to compare feature points of the object touched for augmented reality with a machine learning object database (DB), read a representative 3D object having a highest concordance rate with the object from the machine learning object DB, and transmit the representative 3D object to the video processor.

In the mobile augmented reality video editing system, the video processor may generate a corrected video, whose scale has been adjusted according to a scale value of the object touched for augmented reality with respect to a screen, by compositing the representative 3D object into the real image.

In addition, the video processor may generate a corrected video in which the 3D object has been adjusted in size, position, and color according to a user command from the video editing tools.

3. Advantageous Effects

According to the aforementioned technical solutions, the present invention makes it possible to conveniently and rapidly edit a real image acquired from a mobile device with simple manipulation.

Also, the present invention can minimize sense of difference or unnaturalness which may be felt from an edge part when an object in a real image acquired from a mobile device is edited.

Additionally, the present invention automatically recognizes characteristics of an object selected by a user from among objects in a real image acquired from a mobile device and replaces the object with a standardized, authorized, or realistic representative 3D object so that an augmented reality video may be obtained in a new form.

Further, when a system according to an exemplary embodiment of the present invention is used, it is possible to obtain a video in which a standardized representative 3D object is inserted into real images. Therefore, it is possible to experience the sense of presence, 3D effects, and realism which are felt when only an object actually existing in the real space is automatically recognized and newly remodeled. Also, it is possible to obtain the most realistic, aesthetic, or fantastic edited video according to characteristics of the representative 3D object.

DETAILED DESCRIPTION OF EMBODIMENTS

Hereinafter, exemplary embodiments of the present invention will be described in detail with reference to the accompanying drawings. When a known function or element related to the present invention may unnecessarily obscure the gist of the present invention, a detailed description thereof will be omitted.

Figure 1:
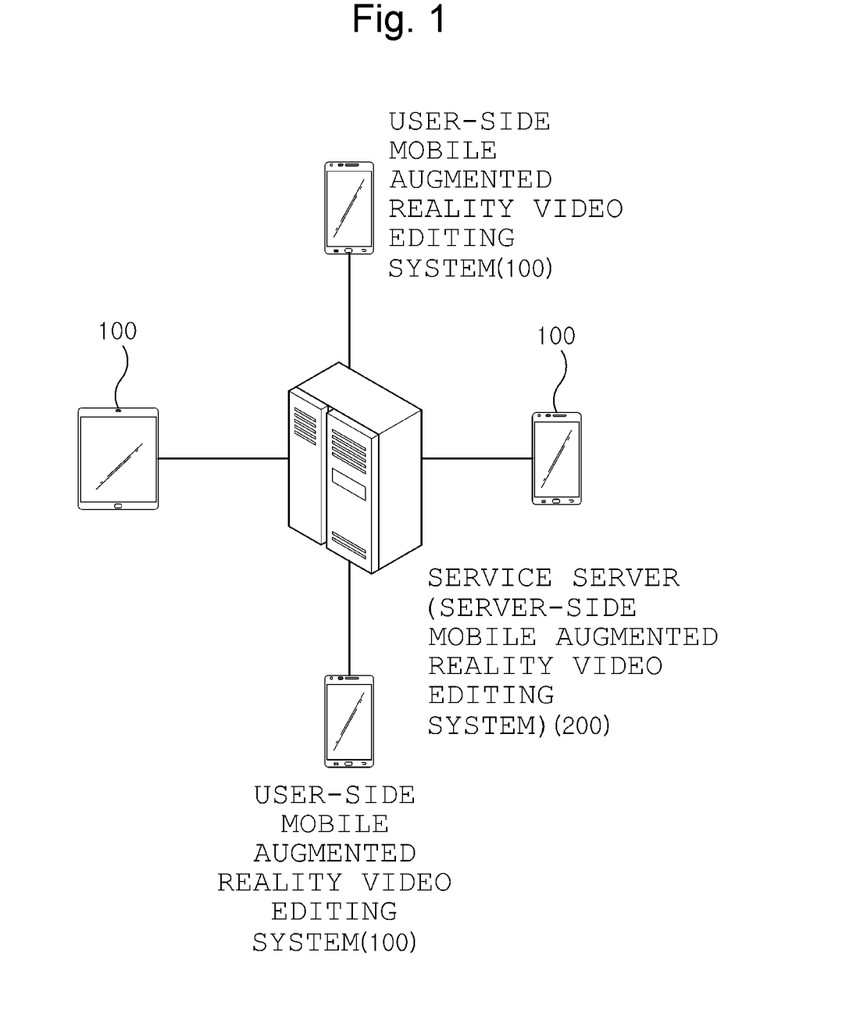
FIG. 1 shows an example of a configuration of a mobile augmented reality video editing system according to an exemplary embodiment of the present invention.

FIG. 1 shows an example of a configuration of a mobile augmented reality video editing system according to an exemplary embodiment of the present invention. A mobile augmented reality video editing system according to an exemplary embodiment of the present invention can be divided into a user-side mobile augmented reality video editing system 100 which may be downloaded and executed in a user's mobile device and a service server-side mobile augmented reality video editing system 200 which provides an additional service in conjunction with the user-side mobile augmented reality video editing system 100.

The user-side mobile augmented reality video editing system 100 deletes an object, moves an object, composites an object, and composites a three-dimensional (3D) object in a real image acquired through at least one image sensor, such as a camera, provided in the mobile device at a request of the device user and displays processing results on a screen thereof.

Meanwhile, the service server-side mobile augmented reality video editing system 200 provides a service requested by the device user (i.e., a service user) in conjunction with the user-side mobile augmented reality video editing system 100. As such a service, the service server-side mobile augmented reality video editing system 200 detects feature points of an object transmitted from the user-side mobile augmented reality video editing system 100, compares the feature points with a machine learning object database (DB), recognizes the object through a 3D object having a highest concordance rate, reads a representative 3D object which represents the 3D object having the highest concordance rate from the machine learning object DB, and transmits the representative 3D object to the user-side mobile augmented reality video editing system 100. The transmitted 3D object is composited into the real image acquired from the user's mobile device and displayed as an augmented reality video.

The configuration of the user-side mobile augmented reality video editing system 100 will be described in further detail below with reference to FIG. 2. The user-side mobile augmented reality video editing system 100 described below can be implemented in the form of an application (app) which can be downloaded to a memory of a mobile device and executed. Parts of the app, each of which is a set of program code data for executing a specific function, interoperate with each other, thereby making it possible to edit a mobile augmented reality video.

Figure 2:
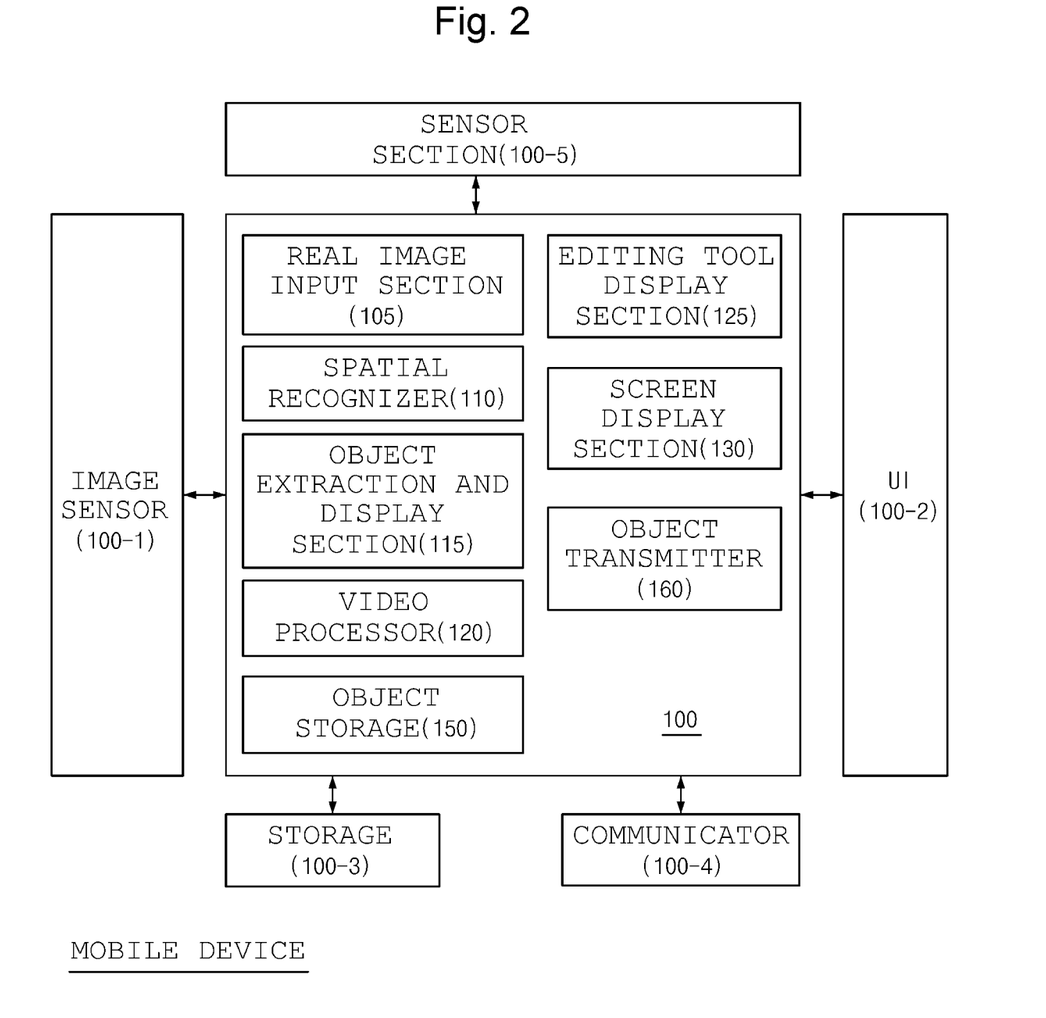
FIG. 2 shows an example of a block diagram of a user-side mobile augmented reality video editing system installed on a mobile device of FIG. 1.

FIG. 2 shows an example of a block diagram of the user-side mobile augmented reality video editing system 100 installed in a mobile device of FIG. 1. As shown in the drawing, the user-side mobile augmented reality video editing system 100 includes a real image input section 105 for receiving a real image through an image sensor 100-1, a spatial recognizer 110 for separately recognizing the ground surface and a space within the real image, an object extraction and display section 115 for extracting and displaying objects in the real image, an editing tool display section 125 for displaying video editing tools to a user, a video processor 120 for deleting an object touched for deletion by the user among the extracted and displayed objects in the real image and correcting horizontal lines constituting a region of the deleted object by substituting each of the horizontal lines with a pixel value of the same height in an adjacent space, and a screen display section 130 for displaying the real image corrected by the video processor 120.

Among the terms, "object touched for deletion" is construed as an object which is touched by the user after the user inputs a "deletion" command through a video editing tool, and "object touched for movement" is construed as an object which is touched by the user after the user inputs an "object movement" command through a video editing tool. Also, "object touched for storage" is construed as an object which is touched by the user after the user inputs an "object save" command through a video editing tool. When an object is touched after a command is input (strictly speaking, this corresponds to a touch) through a video editing tool as mentioned above, the touched object is post-processed according to the input command.

The video processor 120 among the elements shown in FIG. 2 deletes an object touched for movement by the user among the extracted and displayed objects from the real image, corrects horizontal lines constituting a region of the deleted object by substituting each of the horizontal lines with a pixel value of the same height in an adjacent space, and adjusts a scale of the object touched for movement using 3D coordinate values of a pixel corresponding to a position designated for object movement, thereby generating a corrected video in which the object has been moved.

In addition to the aforementioned system configuration, the user-side mobile augmented reality video editing system 100 according to another exemplary embodiment of the present invention may further include an object storage 150 for matching an object, which is touched for storage by the user, among the extracted and displayed objects to an input filename and storing the object in a storage 100-3. In this case, the video processor 120 adjusts a scale of an object selected from the storage 100-3 by the user with 3D coordinate values of a pixel corresponding to a position designated for object composition and composites the selected object into the real image, thereby generating a corrected video into which the object has been composited.

In addition to the above-described elements, the mobile augmented reality video editing system 100 according to another exemplary embodiment of the present invention further includes an object transmitter 160 for transmitting an object touched for augmented reality by the user among the extracted and displayed objects to an interoperable external device, that is, the service server-side mobile augmented reality video editing system 200, via a communication network and a server for comparing the object touched for augmented reality with a machine learning object DB, reading a 3D object having the highest concordance rate from the machine learning object DB, and transmitting the 3D object to the video processor 120.

This means that the mobile augmented reality video editing system according to an exemplary embodiment of the present invention can be divided into the user-side mobile augmented reality video editing system 100 and the service server-side mobile augmented reality video editing system 200.

Additionally, the video processor 120 generates a corrected video, whose scale has been adjusted according to a scale value of the object touched for augmented reality with respect to the screen, by compositing the 3D object into the real image.

Further, the video processor 120 may generate a corrected video in which the 3D object has been adjusted in size, position, and color according to a user command from the video editing tools.

Elements which have not been described in FIG. 2 are described now. An image sensor 100-1 which corresponds to a video input section generates a real image by scanning and capturing a video of the real space. The image sensor 100-1 includes 3D coordinates corresponding to each pixel constituting the image. According to an exemplary embodiment of the present invention, the image sensor 100-1 is shown as a 3D sensor, but one or more cameras capable of acquiring 3D coordinates of each pixel in the image may be used as a video input section.

A user interface (UI) 100-2 can be implemented as a touch screen which has functions of a manipulator for inputting a user command and functions of a display section for displaying various images and operating status.

The storage 100-3 stores an object selected by the user, 3D objects, real images, etc. in addition to data of a plurality of application programs for driving the mobile device. A communicator 100-4 includes technical elements for connecting to a mobile communication network and performing short-range communication and connects to a service server or exchanges data with a nearby device.

A sensor section 100-5 includes an acceleration sensor, a gyro sensor, etc. and may be used to separately recognize the ground surface and a space in an exemplary embodiment of the present invention.

Operation of the mobile augmented reality video editing system 100 including the above-described elements will be described in further detail below with reference to FIGS. 3 to 8.

Figure 3:
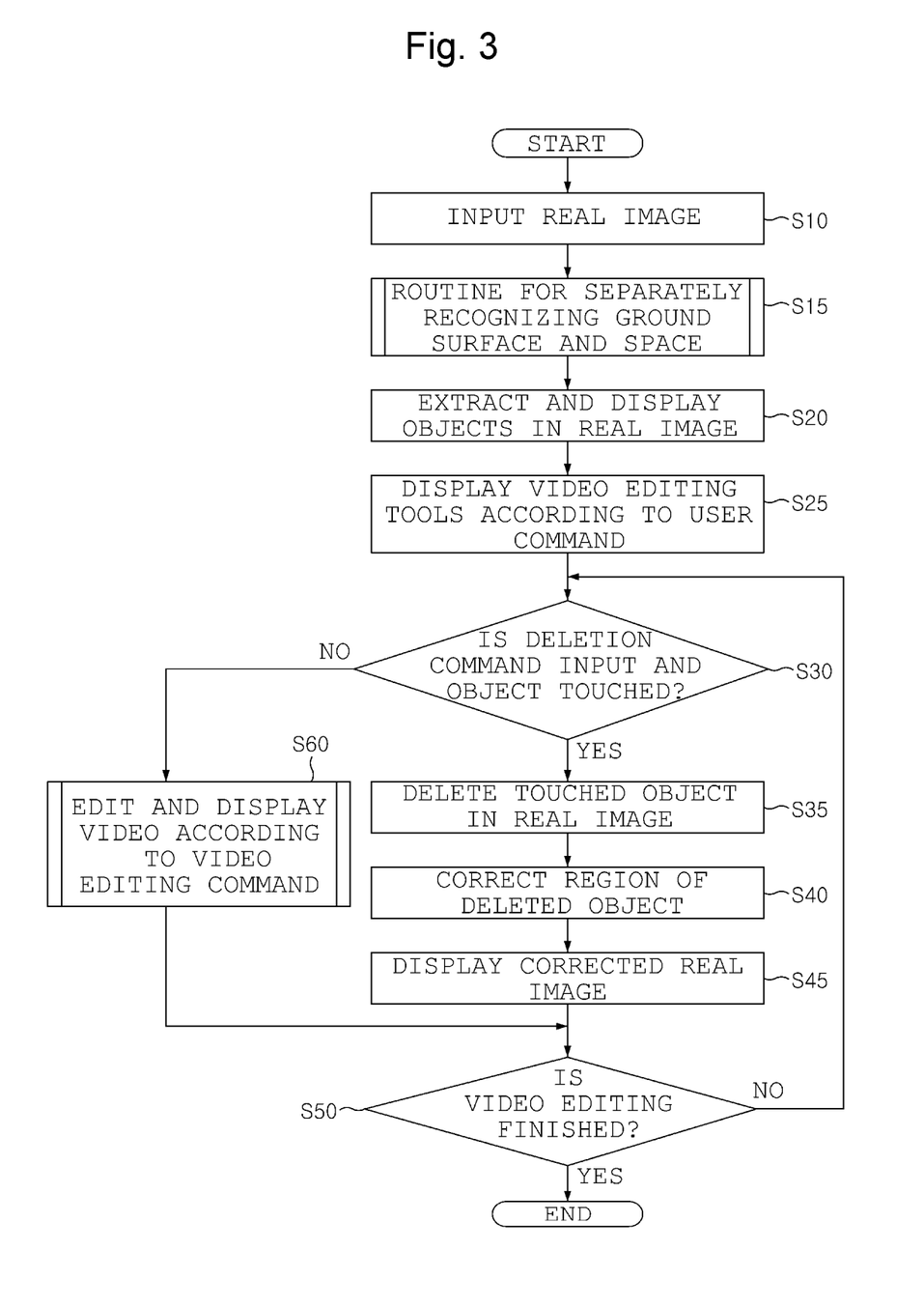
FIG. 3 is a flowchart of editing of a mobile augmented reality video according to an exemplary embodiment of the present invention.
Figure 4:
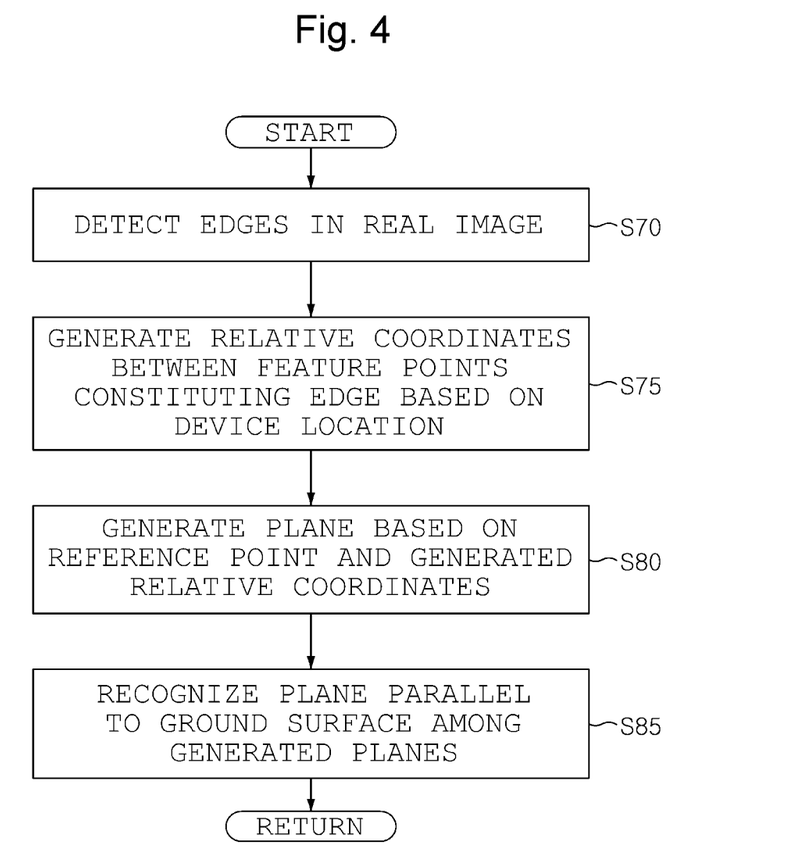
FIG. 4 shows an example of a flowchart of separate recognition of the ground surface and a space according to an exemplary embodiment of the present invention.
Figure 5:
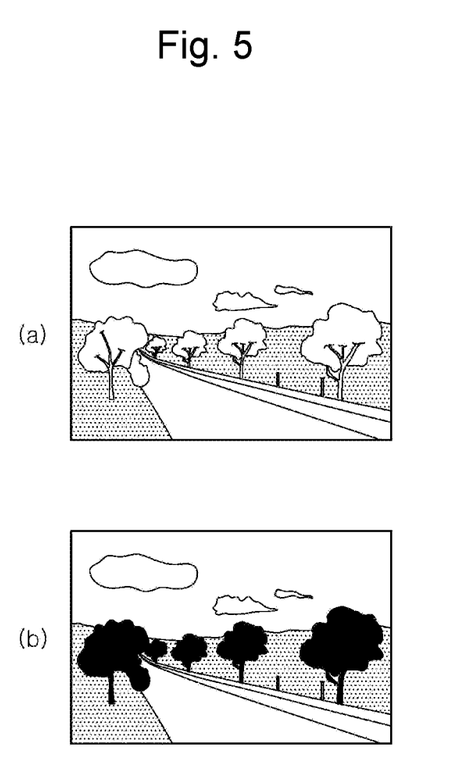
FIG. 5 shows an example of a real image according to an exemplary embodiment of the present invention.
Figure 6:
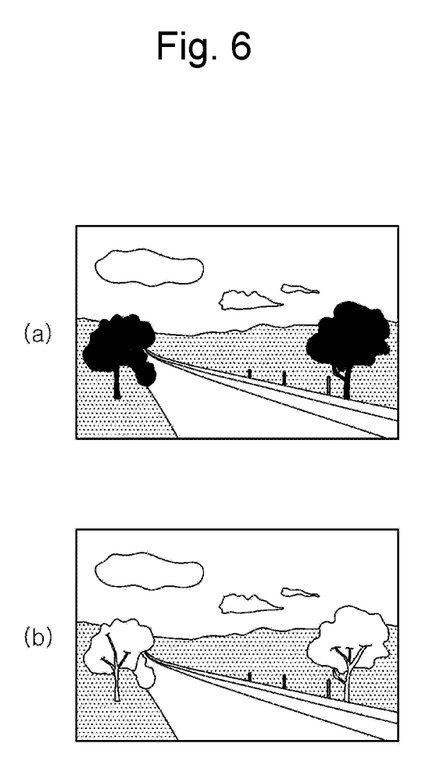
FIG. 6 shows an example view for comparison between scenes before and after an object is deleted.
Figure 7:
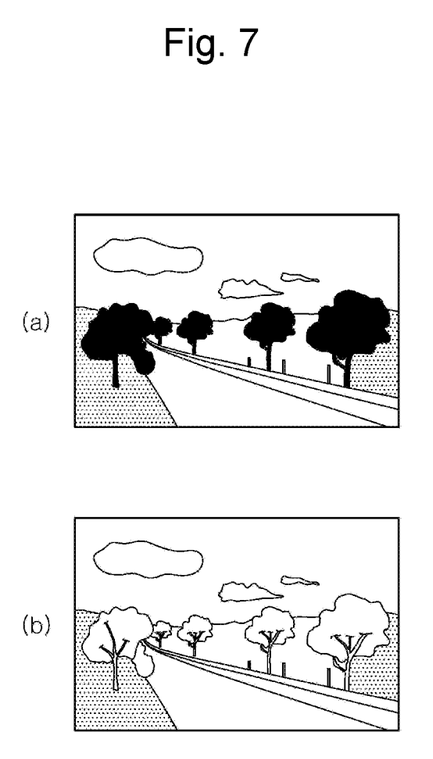
FIG. 7 shows an example view for comparison between scenes before and after an object is moved.
Figure 8:
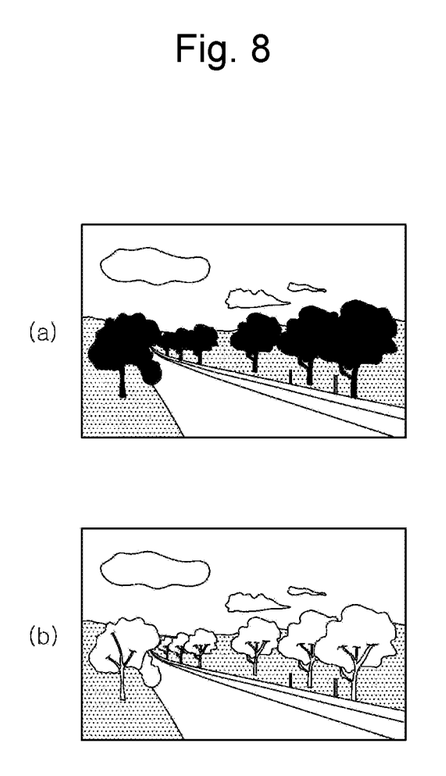
FIG. 8 shows an example view for comparison between scenes before and after object composition is processed.

FIG. 3 is a flowchart of editing of a mobile augmented reality video according to an exemplary embodiment of the present invention, FIG. 4 shows an example of a flowchart of separate recognition of the ground surface and a space according to an exemplary embodiment of the present invention, FIG. 5 shows an example of a real image according to an exemplary embodiment of the present invention, FIG. 6 shows an example view for comparison between scenes before and after an object is deleted, FIG. 7 shows an example view for comparison between scenes before and after an object is moved, and FIG. 8 shows an example view for comparison between scenes before and after object composition is processed.

Referring to FIG. 3, first, a person who wants to edit a mobile augmented reality video using his or her mobile device downloads and executes the user-side mobile augmented reality video editing system 100 according to an exemplary embodiment of the present invention.

When the mobile augmented reality video editing system 100 is executed, the image sensor 100-1 takes a video of the real space and outputs a real image, and the real image is input to the real image input section 105 of the user-side mobile augmented reality video editing system 100 (operation S10). An example of the real image generated through the image sensor 100-1 is shown in FIG. 5A.

The spatial recognizer 110 which receives the real image through the real image input section 105 executes a routine for separately recognizing the ground surface and a space and separately recognizes the ground surface and a space in the real image. This is described in further detail now with reference to FIG. 4.

First, the spatial recognizer 110 detects edges in the real image (operation S70). Since a method of detecting an edge of an object in a certain image is a technique widely known in the field of video signal processing, a detailed description thereof will be omitted. When an edge detection technique is applied to the real image, it is possible to extract objects from the real image and detect boundaries of a road, things, and the like.

When edge detection is performed on the real image, the spatial recognizer 110 generates relative coordinates between feature points constituting an edge on the basis of the location of the mobile device (corresponding to a reference point) (operation S75). Subsequently, planes are generated using the reference point and two of the generated relative coordinates (operation S80), and a plane which is parallel to the ground surface is recognized as the ground surface among the generated planes (operation S85). In this way, the ground surface and a space are separately recognized.

Meanwhile, the object extraction and display section 115 extracts an object which may have a shape through edge detection from the real image in which the ground surface and a space are separately recognized and displays the extracted object in the UI 100-2 (operation S20). As shown in FIG. 5B, to increase the visibility of the extracted object, the edge of the extracted object may become bold, or visibility of an object region may be turned on.

When the object is extracted and displayed in the real image, the user calls video editing tools for video editing, and the editing tool display section 125 displays the video editing tools in response to the call (operation S25). The video editing tools include a "deletion" command for deleting an object, an "object movement" command for moving an object, and a "save" command for storing an object. These are only examples, and various tools for video editing may be further included.

When the video editing tools are displayed, the user inputs (or touches) a command that he or she wants. For example, when the user wants to delete the object, the user inputs the "deletion" command and then touches the object to be deleted. When the deletion command is input through the video editing tools and the corresponding object is touched (operation S30), the video processor 120 deletes the object touched for deletion by the user as shown in FIG. 6A among objects extracted and displayed in the real image as shown in FIG. 5B (operation S35) and corrects horizontal lines constituting a region of the deleted object by substituting each of the horizontal lines with a pixel value of the same height (from the ground surface) in an adjacent space (operation S40).

When the video processor 120 finishes processing the object that has been requested for editing by the user, the screen display section 130 displays a real image, which is obtained by turning off the visibility of the object region as shown in FIG. 6B, as a real image corrected by the video processor 120 (operation S45).

Comparatively referring to FIG. 6B and FIG. 5A, the user may conveniently edit the real image shown in FIG. 5A as shown in FIG. 6B simply by calling video editing tools in his or her mobile device, inputting a deletion command with a touch, and selecting an object to be deleted.

Also, horizontal lines in a region in which an object is deleted are corrected by substituting each of the horizontal lines with a pixel value of the same height (from the ground surface) in a space adjacent to the object region. Therefore, pixel values of the region of the deleted object harmonize with pixel values of an adjacent space, and it is possible to obtain a natural video. Also, since edge lines of the object and the ground surface are substituted with pixel values of the same horizontal lines, it is possible to minimize the sense of difference or editing which may be felt from an edge part.

As an example, an exemplary embodiment of the present invention shows that each horizontal line is simply substituted with a pixel value of the same height in an adjacent space. However, when the pixel value of the same height in the adjacent space has a pattern, it is necessary to correct a corrected region to reflect the pattern. An operation of processing an object in a real image according to a video editing command other than object deletion will be described in detail below.

When an object movement command, an object touch, and a position designated for object movement are sequentially input for the real image through the video editing tools while the system 100 is running (operation S60), the video processor 120 deletes an object touched for movement by the user in the real image among the objects extracted and displayed in operation S20, corrects horizontal lines constituting a region of the deleted object by substituting each of the horizontal lines with a pixel value of the same height in an adjacent space, adjusts a scale of the object touched for movement using 3D coordinate values of a pixel corresponding to the position designated for object movement, more specifically, depth coordinates (a z-axis assuming that a x-axis is a horizontal axis and a y-axis is a vertical axis) which give perspective (operation S60).

A corrected video obtained by moving an object existing in the real image (FIG. 5A) is shown in FIG. 7A. Compared to FIG. 5A, the corrected video of FIG. 7A shows that a tree which is a second object on the right side of the road has been moved to the right. Since the scale of the object touched for movement has been adjusted according to depth coordinates of a pixel at the position designated for object movement even in the corrected video, it is possible to obtain a video-edited scene in which the object touched for movement harmonizes with surrounding objects or the background. For reference, FIG. 7B shows a finally displayed scene which is obtained by the screen display section 130 turning off visibility of object regions.

Meanwhile, when an object copy command, an object touch, and a position designated for object copy are sequentially input through the video editing tools, the video processor 120 generates a corrected video in which an object touched for copy by the user among the objects extracted and displayed in operation S20 is adjusted in scale using depth coordinates and pasted to the position designated for object copy as shown in FIG. 8A. FIG. 8A is a scene obtained by copying a tree which is a first object on the right side of the road in the real image (FIG. 5A) to the left.

As described above, the user-side mobile augmented reality video editing system 100 according to an exemplary embodiment of the present invention enables the user to conveniently and rapidly edit a real image acquired through the image sensor 100-1 with simple touch operations on the mobile device.

Also, according to the present invention, a video is corrected using pixel values of an edge line or a nearby region of an object region, and thus it is possible to obtain a natural edited video.

In addition to the above-described video editing, the user may composite a separately stored object into one real image using the mobile augmented reality video editing system 100 according to an exemplary embodiment of the present invention.

For example, the object storage 150 matches objects (construed as objects touched after a save command is input), which are touched for storage by the user, among the objects extracted and displayed in operation S20 to filenames input by the user and store the objects in the storage 100-3. Subsequently, according to a composition command of the user, the video processor 120 may generate a corrected image by adjusting a scale of an object selected by the user from the storage 100-3 with 3D coordinate values of a pixel corresponding to a position designated for object composition and compositing the object into the real image. Such a corrected video is displayed through the screen display section 130 as described above.

Also, the mobile augmented reality video editing system 100 according to an exemplary embodiment of the present invention can composite a virtual object into a real image acquired through the image sensor 100-1 and display the augmented reality image and may composite an optimal 3D object obtained through machine learning into the real image and display the augmented reality image. Here, the optimal 3D object obtained through machine learning may be a 3D object which is created through machine learning to be recognized as realistic and objective, a standardized 3D objector an authorized 3D object.

It may be difficult for ordinary people to edit an optimal augmented reality video due to the limitation of place, time, cost, and the like. When it is possible to edit an augmented reality video by replacing an object obtained from a real image with an object which has been recognized as realistic and objective, a standardized object, or the like, the most realistic, aesthetic, or fantastic edited video may be created without infringing copyrights.

Accordingly, the object transmitter 160 of the mobile augmented reality video editing system 100 according to an exemplary embodiment of the present invention transmits an object touched for augmented reality by the user (construed as an object touched after an augmented reality command is input) among the objects extracted and displayed in operation S20 to the interoperable service server-side mobile augmented reality video editing system 200 via a communication network.

For example, assuming that an object touched for augmented reality is a poodle in a real image and a scene in which an owner is walking with the leashed poodle is included in the real image, the shape of the poodle or feature points of the shape of the poodle are transmitted to the service server-side mobile augmented reality video editing system 200.

Then, the service server-side mobile augmented reality video editing system 200 detects feature points of the shape of the object touched for augmented reality, that is, the poodle, compares the detected feature points with the machine learning object DB, and recognizes a 3D object having a highest concordance rate. As a result, the service server may recognize the received object as a poodle, and transmits a representative 3D object of the recognized object to the video processor 120 of the user-side mobile augmented reality video editing system 100.

Assuming that the representative 3D object received from the service server is a 3D shape of a poodle which is a poodle prize winner of the year, the video processor 120 corrects the real image by compositing the received representative 3D object into the real image. In this case, the video processor 120 may generate a corrected video by adjusting a scale of the representative 3D object according to a scale value of an object touched for augmented reality in a previous real image with respect to the screen so that a natural edited video may be obtained. The video processor 120 may also generate a corrected video in which the representative 3D object has been adjusted in size, position, and color according to a user command from the video editing tools.

When the user-side mobile augmented reality video editing system 100 of the present invention is configured to interoperate with the machine learning DB located on the service server side as described above, the service user may obtain an edited augmented reality video in which the owner accompanies the dog which is the poodle prize winner of the year.

This is a mere example, and it is possible to obtain a video in which a standardized representative 3D object is inserted into real images using a system according to an exemplary embodiment of the present invention. Therefore, the system can be used as a tool for experiencing the sense of presence, 3D effects, and realism which are felt when only an object actually existing in the real space is automatically recognized and newly remodeled.

Although the present invention has been described above with reference to embodiments shown in the drawings, those of ordinary skill in the art shall appreciate that the embodiments are exemplary and various modifications and equivalents can be made from the embodiments. Therefore, the technical range of the present invention should be determined by the following claims.

The invention claimed is:

1. A mobile augmented reality video editing system comprising:
   a real image input section receiving a real image through an image sensor;
   a spatial recognizer separately recognizing a ground surface and a space within the real image;
   an object extraction and display section extracting and displaying objects in the real image;
   an editing tool display section displaying video editing tools to a user;
   a video processor deleting an object touched for deletion by the user among the extracted and displayed objects in the real image and correct horizontal lines constituting a region of the deleted object by substituting each of the horizontal lines with a pixel value of a height identical to that of the horizontal line in an adjacent space; and
   a screen display section displaying the real image corrected by the video processor,
   wherein the spatial recognizer detects edges in the real image, generates relative coordinates between feature points constituting an edge on the basis of the location of a mobile device, generates planes using a reference point and two of the generated relative coordinates and recognizes a plane which is parallel to the ground surface among the generated planes.

2. The mobile augmented reality video editing system according to claim 1,
   wherein the video processor deletes an object touched for movement by the user among the extracted and displayed objects from the real image, corrects horizontal lines constituting a region of the deleted object by substituting each of the horizontal lines with a pixel value of a height identical to a pixel value of the horizontal line in an adjacent space, adjusts a scale of the object touched for movement using three-dimensional (3D) coordinate values of a pixel corresponding to a position designated for object movement, and thereby generates a corrected video in which the object has been moved.

3. The mobile augmented reality video editing system according to claim 1,
   further comprising an object storage matching an object, which is touched for storage by the user, among the extracted and displayed objects to an input filename and store the object in a storage,
   wherein the video processor adjusts a scale of an object selected from the storage by the user with 3D coordinate values of a pixel corresponding to a position designated for object composition, composites the selected object into the real image, and thereby generates a corrected video into which the object has been composited.

4. The mobile augmented reality video editing system according to claim 3, wherein, in addition to the real image input section, the spatial recognizer, the object extraction and display section, the editing tool display section, the video processor, and the screen display section, the object storage is a set of program code data constituting an app which is able to be downloaded to a memory of a user mobile device and executed.

5. The mobile augmented reality video editing system according to claim 1, further comprising:

an object transmitter transmitting an object touched for augmented reality by the user among the extracted and displayed objects to an interoperable external device via a communication network; and a service server comparing feature points of the object touched for augmented reality with a machine learning object database (DB), read a representative 3D object having a highest concordance rate with the object from the machine learning object DB, and transmit the representative 3D object to the video processor.

6. The mobile augmented reality video editing system according to claim 5, wherein the video processor generates a corrected video, whose scale has been adjusted according to a scale value of the object touched for augmented reality with respect to a screen, by compositing the representative 3D object into the real image.

7. The mobile augmented reality video editing system according to claim 6, wherein the video processor generates a corrected video in which the representative 3D object has been adjusted in size, position, and color according to a user command from the video editing tools.

8. The mobile augmented reality video editing system according to claim 5, wherein, in addition to the real image input section, the spatial recognizer, the object extraction and display section, the editing tool display section, the video processor, and the screen display section, the object transmitter is a set of program code data constituting an app which is able to be downloaded to a memory of a user mobile device and executed.

9. The mobile augmented reality video editing system according to any one of claim 1, wherein each of the real image input section, the spatial recognizer, the object extraction and display section, the editing tool display section, the video processor, and the screen display section is a set of program code data constituting an application (app) which is able to be downloaded to a memory of a user mobile device and executed.

* * * * *